US011870160B2

(12) United States Patent
Isik et al.

(10) Patent No.: US 11,870,160 B2
(45) Date of Patent: Jan. 9, 2024

(54) CLOAKED LOW BAND ELEMENTS FOR MULTIBAND RADIATING ARRAYS

(71) Applicant: CommScope Technologies LLC, Hickory, NC (US)

(72) Inventors: Ozgur Isik, Gladesville (AU); Philip Raymond Gripo, Toongabbie (AU); Dushmantha Nuwan Prasanna Thalakotuna, Rosehill (AU); Peter J. Liversidge, Glenbrook (AU)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 18/147,857

(22) Filed: Dec. 29, 2022

(65) Prior Publication Data

US 2023/0139294 A1 May 4, 2023

Related U.S. Application Data

(63) Continuation of application No. 17/038,070, filed on Sep. 30, 2020, now Pat. No. 11,552,398, which is a (Continued)

(51) Int. Cl.

*H01Q 21/12* (2006.01)
*H01Q 5/49* (2015.01)

(Continued)

(52) U.S. Cl.

CPC ................. *H01Q 5/49* (2015.01); *H01Q 1/24* (2013.01); *H01Q 1/523* (2013.01); *H01Q 9/16* (2013.01);

(Continued)

(58) Field of Classification Search

CPC ............ H01Q 5/49; H01Q 1/24; H01Q 1/523; H01Q 9/16; H01Q 19/108; H01Q 21/062; H01Q 21/26

See application file for complete search history.

(56) References Cited

U.S. PATENT DOCUMENTS 5,012,256 A * 4/1991 Maddocks ........... H01Q 21/062 342/368
6,040,805 A 3/2000 Huynh et al.

(Continued)

FOREIGN PATENT DOCUMENTS

| | | |
|---|---|---|
| CN | 1349674 A | 5/2002 |
| CN | 1248363 C | 3/2006 |

(Continued)

OTHER PUBLICATIONS

Notification of the First Office Action for Chinese Patent Application No. 201910210195.5, dated Sep. 29, 2020, 39 pages.

(Continued)

*Primary Examiner* — Joseph J Lauture
(74) *Attorney, Agent, or Firm* — Myers Bigel, P.A.

(57) ABSTRACT

A multiband antenna, having a reflector, and a first array of first radiating elements having a first operational frequency band, the first radiating elements being a plurality of dipole arms, each dipole arm including a plurality of conductive segments coupled in series by a plurality of inductive elements; and a second array of second radiating elements having a second operational frequency band, wherein the plurality of conductive segments each have a length less than one-half wavelength at the second operational frequency band.

20 Claims, 5 Drawing Sheets

Related U.S. Application Data continuation of application No. 16/711,536, filed on Dec. 12, 2019, now Pat. No. 10,819,032, which is a continuation of application No. 16/655,479, filed on Oct. 17, 2019, now Pat. No. 10,547,110, which is a continuation of application No. 16/277,044, filed on Feb. 15, 2019, now Pat. No. 10,498,035, which is a continuation of application No. 15/517,906, filed as application No. PCT/US2015/044020 on Aug. 6, 2015, now Pat. No. 10,439,285.

(60) Provisional application No. 62/081,358, filed on Nov. 18, 2014.

(51) Int. Cl.

| | |
|---|---|
| ***H01Q 1/52*** | (2006.01) |
| ***H01Q 9/16*** | (2006.01) |
| ***H01Q 19/10*** | (2006.01) |
| ***H01Q 21/06*** | (2006.01) |
| ***H01Q 21/26*** | (2006.01) |
| ***H01Q 1/24*** | (2006.01) |
| *H01Q 25/00* | (2006.01) |
| *H01Q 21/30* | (2006.01) |

(52) U.S. Cl.

CPC ......... *H01Q 19/108* (2013.01); *H01Q 21/062* (2013.01); *H01Q 21/26* (2013.01); *H01Q 1/246* (2013.01); *H01Q 1/52* (2013.01); *H01Q 19/10* (2013.01); *H01Q 21/06* (2013.01); *H01Q 21/30* (2013.01); *H01Q 25/00* (2013.01); *H01Q 25/001* (2013.01)

(56) References Cited

U.S. PATENT DOCUMENTS

| | | | |
|---|---|---|---|
| 6,417,816 | B2 | 7/2002 | Sadler et al. |
| 6,646,611 | B2 | 11/2003 | Plet et al. |
| 6,674,405 | B2 | 1/2004 | Wang |
| 6,847,282 | B2 | 1/2005 | Gomez et al. |
| 6,950,006 | B1 | 9/2005 | Shikama et al. |
| 7,088,299 | B2 | 8/2006 | Siegler et al. |
| 8,405,564 | B2 | 3/2013 | Kindt et al. |
| 9,276,329 | B2 | 3/2016 | Jones et al. |
| 9,553,368 | B1 | 1/2017 | Tonn |
| 10,224,630 | B2 | 3/2019 | Iellci |
| 10,230,161 | B2 | 3/2019 | Baron et al. |
| 10,454,156 | B1 | 10/2019 | Yang et al. |
| 2002/0140618 | A1 | 10/2002 | Plet et al. |
| 2003/0034917 | A1 | 2/2003 | Nishizawa et al. |
| 2004/0032370 | A1 | 2/2004 | Ito et al. |
| 2004/0066341 | A1 | 4/2004 | Ito et al. |
| 2004/0183737 | A1 | 9/2004 | Lindenmeier |
| 2005/0073465 | A1 | 4/2005 | Olson |
| 2007/0090398 | A1 | 4/2007 | Mckinzie |
| 2010/0156747 | A1 | 6/2010 | Montgomery |
| 2011/0133881 | A1 | 6/2011 | Nakajima et al. |
| 2012/0154236 | A1 | 6/2012 | Apostolos et al. |
| 2013/0164904 | A1 | 6/2013 | Smith et al. |
| 2014/0125539 | A1 | 5/2014 | Katipally et al. |
| 2014/0159977 | A1 | 6/2014 | Jones |
| 2015/0214617 | A1 | 7/2015 | Shang et al. |
| 2016/0235169 | A1 | 8/2016 | Cohen |
| 2016/0285169 | A1 | 9/2016 | Shooshtari et al. |
| 2017/0373385 | A1 | 12/2017 | Alu et al. |
| 2018/0331419 | A1 | 11/2018 | Varnoosfaderani et al. |

FOREIGN PATENT DOCUMENTS

| | | | |
|---|---|---|---|
| CN | 1886864 | | 12/2006 |
| CN | 1886864 | A | 12/2006 |
| CN | 102403572 | A | 4/2012 |
| CN | 202259701 | U | 5/2012 |
| CN | 103311651 | A | 9/2013 |
| CN | 103477496 | A | 12/2013 |
| CN | 103545621 | A | 1/2014 |
| CN | 103730728 | A | 4/2014 |
| CN | 103840254 | A | 6/2014 |
| CN | 103943970 | A | 7/2014 |
| CN | 203850436 | U | 9/2014 |
| CN | 104269649 | A | 1/2015 |
| CN | 104269649 | B | 2/2017 |
| CN | 105051975 | B | 4/2019 |
| JP | 2005176120 | | 6/2005 |
| JP | 2005176120 | A | 6/2005 |
| JP | 2013038577 | A | 2/2013 |
| KR | 20130134793 | A | 12/2013 |
| WO | 2005055362 | A1 | 6/2005 |
| WO | 2006025248 | A1 | 3/2006 |
| WO | 2008151451 | A1 | 12/2008 |
| WO | 2014100938 | A1 | 7/2014 |
| WO | 2014146038 | A1 | 9/2014 |

OTHER PUBLICATIONS

"A Dictionary of Electronics and Electrical Engineering, Oxford University Press (5th Edition), 2018".
"Ahmad et al., High Gain Array of Monopole Coupled Antenna for Wireless Applications, International Journal of Antennas and Propagation, vol. 12, 2012".
"Communication Pursuant to Article 94(3) EPC in corresponding European Patent Application No. 15 750 581.9-1205 (dated May 15, 2019)".
"Communication Pursuant to Article 94(3) EPC, corresponding to European Patent Application No. 19151403.3-1205, dated Apr. 15, 2021, 9 pages".
"Dictionary of Electrical and Computer Engineering, McGraw-Hill, Sixth Edition, 2004".
"EMI/RFI Solutions, Electro-Magnetic Compatibility, Vishay Intertechnology, Inc., 2000".
"European Search Report in corresponding patent application No. EP22155629.3, dated Apr. 29, 2022, 10 pages".
"Extended European Search Report for corresponding European Application No. 19151403.3, dated May 17, 2019".
"First Examination Report in corresponding Indian Patent Application No. 201727013833; dated Jun. 30, 2020".
"International Search Report and the Written Opinion of the International Searching Authority in corresponding PCT Application No. PCT/US2015/044020 (dated Nov. 12, 2015)".
"Kaplan, S., Wiley Electrical and Electronics Engineering Dictionary, John Wiley & Sons, Inc., 2004".
"Kraus, J., Electromagnetics, McGraw-Hill, Inc. (4th Edition), 1991".
"Krause, J., Electromagnetics, Transmission line impedance, Ch. 12, p. 502, 1991".
"Laplante, P., Comprehensive Dictionary of Electrical Engineering, CRC Press (2d Edition), 2005".
"Laplante, P., Comprehensive Dictionary of Electrical Engineering, CRC Press, 1998".
"Notification Concerning Transmittal of International Preliminary Report on Patentability in corresponding PCT Application No. PCT/US2015/044020 (dated Jun. 1, 2017)".
"S. K. Padhi and M. E. Bialkowski, "Parametric study of a microstrip Yagi antenna," in Proceedings of the Asia-Pacific Microwave Conference, pp. 715-718, Sydney, NSW, Australia, 2000".
"Standards Coordinating Committee 10, The IEEE Standard Dictionary of Electrical and Electronics Terms, IEEE Std 100 (6th Edition) 1996".
"Stutzman et al., Antenna Theory and Design, John Wiley & Sons, Inc. (3d Edition), 2013".
"Stutzman et al., Cross Polarization for Antennas, Antenna Polarization and Polarization Measurements, Artech House, Inc., 1993".
"Tapia, E.D., Design of Isofrequency Reconfigurable Repeaters, PhD Thesis, Universitat Politecnica de Catalunya, 2013".

(56) References Cited

OTHER PUBLICATIONS

"Translation of Chinese Office Action, corresponding to Chinese Application No. 201580055284.7, dated Aug. 30, 2019, 14 pgs."

* cited by examiner

CLOAKED LOW BAND ELEMENTS FOR MULTIBAND RADIATING ARRAYS

CROSS-REFERENCE TO RELATED APPLICATIONS

The present application is a continuation application of and claims priority from U.S. patent application Ser. No. 17/038,070, filed Sep. 30, 2020, which is a continuation application of U.S. patent application Ser. No. 16/711,536, filed Dec. 12, 2019, which is a continuation application of U.S. patent application Ser. No. 16/655,479 filed Oct. 17, 2019, which is a continuation application of U.S. patent application Ser. No. 16/277,044, filed Feb. 15, 2019, which is a continuation of U.S. patent application Ser. No. 15/517,906, filed Apr. 7, 2017, which is a 35 U.S.C. § 371 national stage application of PCT International Application No. PCT/US2015/044020, filed Aug. 6, 2015, which itself claims priority to U.S. Provisional Patent Application No. 62/081,358, filed Nov. 18, 2014, the disclosure and content of each of the above applications is incorporated by reference herein.

FIELD OF THE INVENTION

This invention relates to wide-band multi-band antennas with interspersed radiating elements intended for cellular base station use. In particular, the invention relates to radiating elements intended for a low frequency band when interspersed with radiating elements intended for a high frequency band. This invention is aimed at minimizing the effect of the low-band dipole arms, and/or parasitic elements if used, on the radio frequency radiation from the high-band elements.

BACKGROUND

Undesirable interactions may occur between radiating elements of different frequency bands in multi band interspersed antennas. For example, in some cellular antenna applications, the low band is 694-960 MHz and the high band is 1695-2690 MHz. Undesirable interaction between these bands may occur when a portion of the lower frequency band radiating structure resonates at the wavelength of the higher frequency band. For instance, in multiband antennas where a higher frequency band is a multiple of a frequency of a lower frequency band, there is a probability that the low band radiating element, or some component or part of it, will be resonant in some part of the high band frequency range. This type of interaction may cause a scattering of high band signals by the low band elements. As a result, perturbations in radiation patterns, variation in azimuth beam width, beam squint, high cross polar radiation and skirts in radiation patterns are observed in the high band.

SUMMARY

In one aspect of the present invention, a low band radiating element for use in a multiband antenna having at least a high band operational frequency and a low band operational frequency is provided. The low band element comprises a first dipole element having a first polarization and comprising a first pair of dipole arms and a second dipole element having a second polarization and comprising a second pair of dipole arms oriented at approximately 90 degrees to the first pair of dipole arms. Each dipole arm includes a plurality of conductive segments, each having a length less than one-half wavelength at the high band operational frequency, coupled in series by a plurality of inductive elements, having an impedance selected to attenuate high band currents while passing low band currents in the dipole arms. The inductive elements are selected to appear as high impedance elements at the high band operational frequency and as lower impedance elements at the low band operational frequency.

In another aspect of the present invention, a multiband antenna is provided. The multiband antenna includes a reflector, a first array of first radiating elements and a second array of second radiating elements. The first radiating elements have a first operational frequency band and the second radiating elements have a second operational frequency band. The first radiating elements include two or more dipole arms. Each dipole arm includes a plurality of conductive segments coupled in series by a plurality of inductive elements. The conductive segments each have a length less than one-half wavelength at the second operational frequency band. The first radiating elements may comprise single dipole elements or cross dipole elements.

The inductive elements are typically selected to appear as high impedance elements at the second operational frequency band and as lower impedance elements at the first operational frequency band. The first operational frequency band typically comprises a low band of the multiband antenna and the second operational frequency band typically comprises a high band of the multiband antenna.

In another aspect of the present invention, parasitic elements may be included on the multiband antenna to shape low band beam characteristics. For example, the parasitic elements may have an overall length selected to shape beam patterns in the first operational frequency band, and comprise conductive segments coupled in series with inductive elements selected to reduce interaction between the parasitic elements and radiation at the second operational frequency band. The conductive segments of the parasitic elements may also have a length of less than one half wave length at the second operational frequency band.

DESCRIPTION OF THE INVENTION

Figure 1:
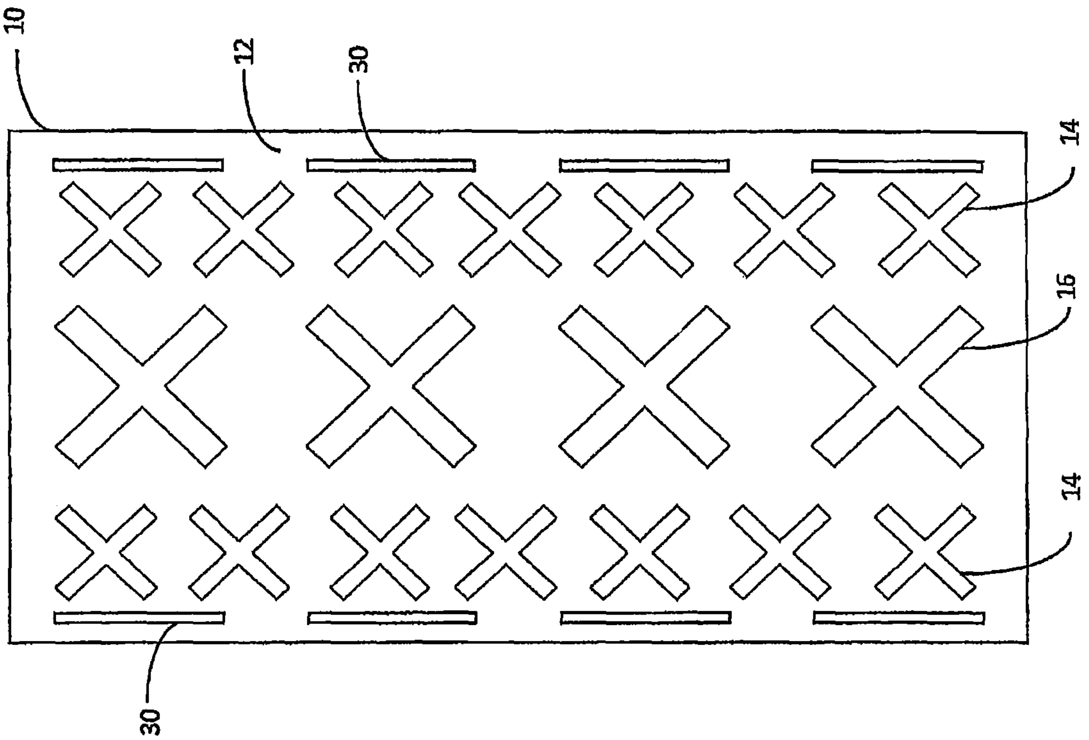
FIG. 1 is a schematic diagram of an antenna according to one aspect of the present invention.

FIG. 1 schematically diagrams a dual band antenna 10. The dual band antenna 10 includes a reflector 12, an array of high band radiating elements 14 and an array of low band radiating elements 16. Optionally, parasitic elements 30 may be included to shape azimuth beam width of the low band elements. Multiband radiating arrays of this type commonly include vertical columns of high band and low band elements spaced at pre-determined intervals See, for example, U.S. patent application Ser. No. 13/827,190, now U.S. Pat. No. 9,276,329 to Jones et al., which is incorporated by reference.

Figure 2:
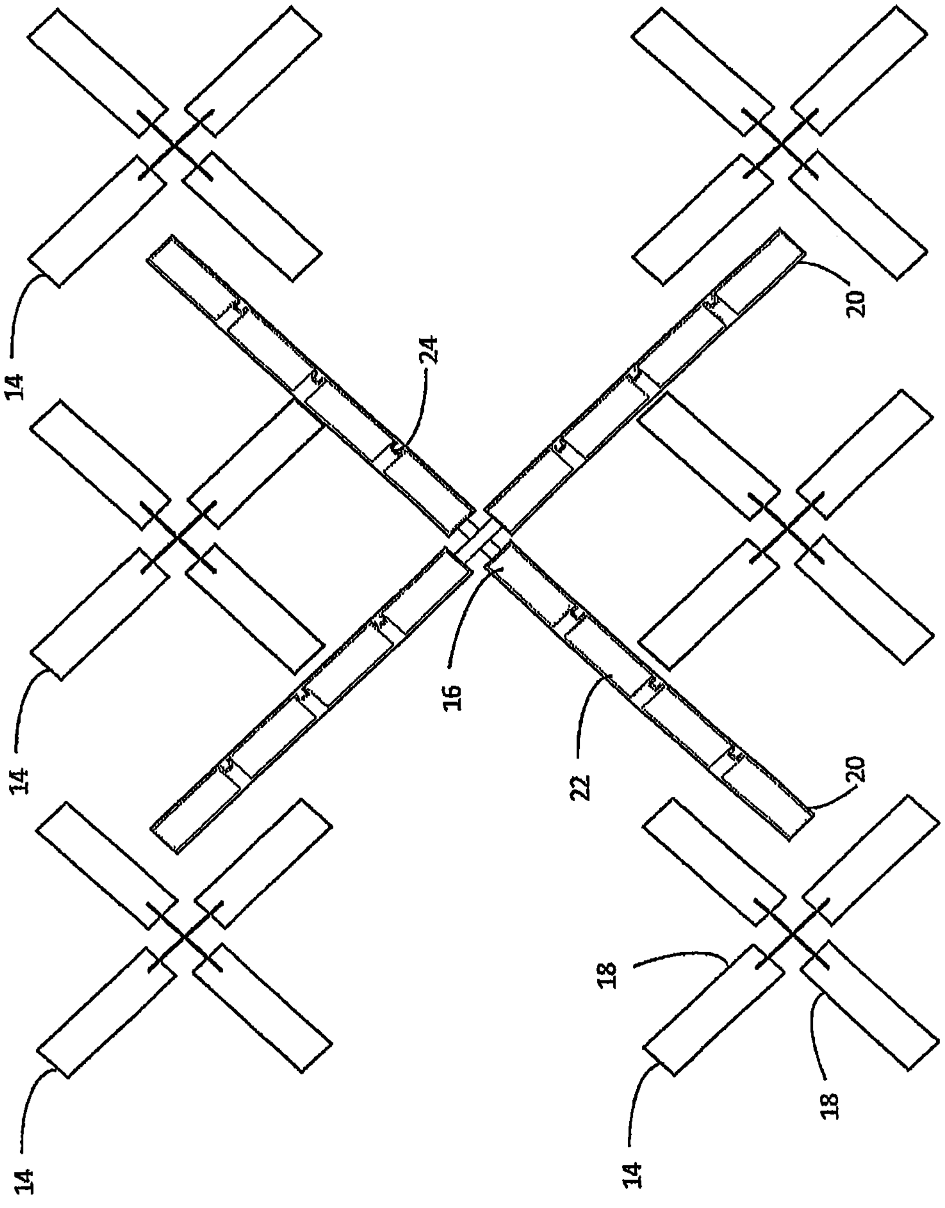
FIG. 2 is a plan view of a portion of an antenna array according to another aspect of the present invention.

FIG. 2 schematically illustrates a portion of a wide band dual band antenna 10 including features of a low band radiating element 16 according to one aspect of the present invention. High band radiating elements 14 may comprise any conventional crossed dipole element, and may include first and second dipole arms 18. Other known high band elements may be used. The low band radiating element 16 also comprises a crossed dipole element, and includes first and second dipole arms 20. In this example, each dipole arm 20 includes a plurality of conductive segments 22 coupled in series by inductors 24.

The low band radiating element 16 may be advantageously used in multi-band dual-polarization cellular base-station antenna. At least two bands comprise low and high bands suitable for cellular communications. As used herein, "low band" refers to a lower frequency band, such as 694-960 MHz, and "high band" refers to a higher frequency band, such as 1695 MHz-2690 MHz. The present invention is not limited to these particular bands, and may be used in other multi-band configurations. A "low band radiator" refers to a radiator for such a lower frequency band, and a "high band radiator" refers to a radiator for such a higher frequency band. A "dual band" antenna is a multi-band antenna that comprises the low and high bands referred to throughout this disclosure.

Figure 3:
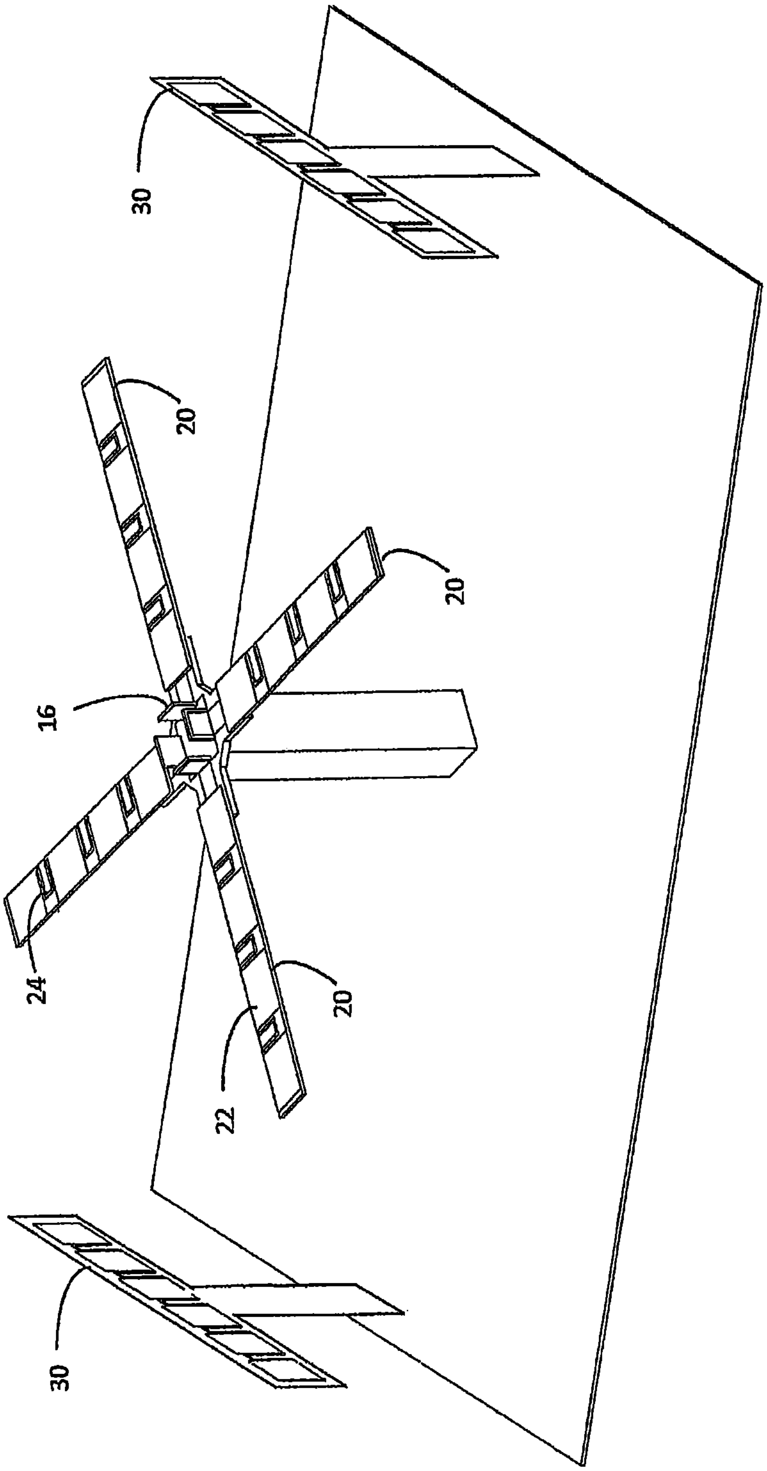
FIG. 3 is an isometric view of a low band radiating element and parasitic elements according to another aspect of the present invention.
Figure 4:
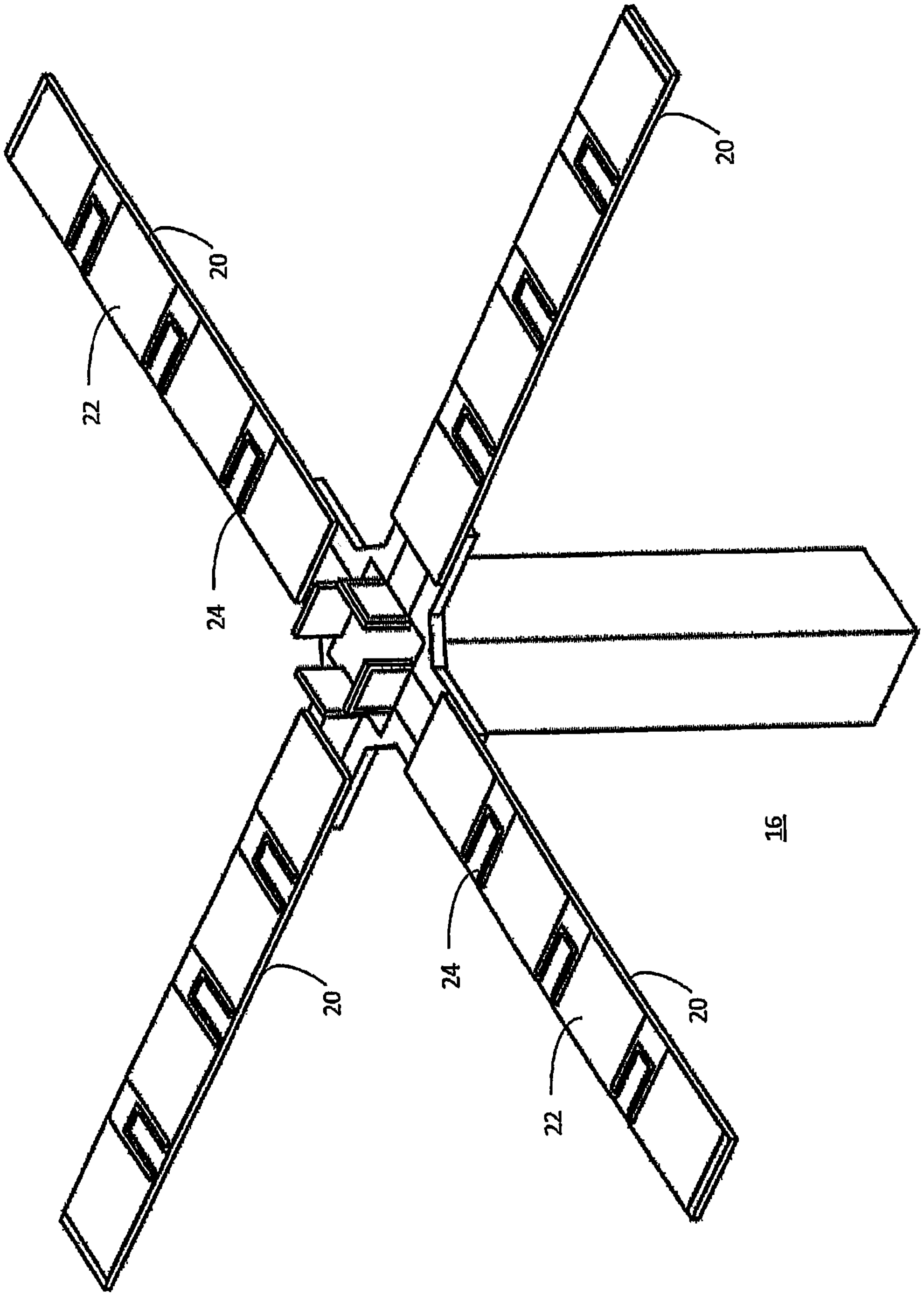
FIG. 4 is a more detailed view of the low band radiating element of FIG. 3.

Referring to FIG. 3, a low band radiating element 16 and a pair of parasitic elements 30 are illustrated mounted on reflector 12. In one aspect of the present invention, parasitic elements 30 are aligned to be approximately parallel to a longitudinal dimension of reflector 12 to help shape the beam width of the pattern. In another aspect of the invention, the parasitic elements may be aligned perpendicular to a longitudinal axis of the reflector 12 to help reduce coupling between the elements. The low band radiating element 16 is illustrated in more detail in FIG. 4. Low band radiating element 16 includes a plurality of dipole arms 20. The dipole arms 20 may be one half wave length long. The low band dipole arms 20 include a plurality of conductive segments 22. The conductive segments 22 have a length of less than one-half wavelength at the high band frequencies. For example, the wavelength of a radio wave at 2690 MHz is about 11 cm, and one-half wavelength at 2690 MHz would be about 5.6 cm. In the illustrated example, four segments 22 are included, which results in a segment length of less than 5 cm, which is shorter than one-half wavelength at the upper end of the high band frequency range. The conductive segments 22 are connected in series with inductors 24. The inductors 24 are configured to have relatively low impedance at low band frequencies and relatively higher impedance at high band frequencies.

In the examples of FIGS. 2 and 3, the dipole arms 20, including conductive segments 22 and inductors 24, may be fabricated as copper metallization on a non-conductive substrate using, for example, conventional printed circuit board fabrication techniques. In this example, the narrow metallization tracks connecting the conductive segments 22 comprise the inductors 24. In other aspect of the invention, the inductors 24 may be implemented as discrete components.

At low band frequencies, the impedance of the inductors 24 connecting the conductive segments 22 is sufficiently low to enable the low band currents continue to flow between conductive segments 22. At high band frequencies, however, the impedance is much higher due to the series inductors 24, which reduces high band frequency current flow between the conductive segments 22. Also, keeping each of the conductive segments 22 to less than one half wavelength at high band frequencies reduces undesired interaction between the conductive segments 22 and the high band radio frequency (RF) signals. Therefore, the low band radiating elements 16 of the present invention reduce and/or attenuate any induced current from high band RF radiation from high band radiating elements 14, and any undesirable scattering of the high band signals by the low band dipole arms 20 is minimized. The low band dipole is effectively electrically invisible, or "cloaked," at high band frequencies.

As illustrated in FIG. 3, the low band radiating elements 16 having cloaked dipole arms 20 may be used in combination with cloaked parasitic elements 30. However, either cloaked structure may also be used independently of the other. Referring to FIGS. 1 and 3, parasitic elements 30 may be located on either side of the driven low band radiating element 16 to control the azimuth beam width. To make the overall low band radiation pattern narrower, the current in the parasitic element 30 should be more or less in phase with the current in the driven low band radiating element 16. However, as with driven radiating elements, inadvertent resonance at high band frequencies by low band parasitic elements may distort high band radiation patterns.

Figure 5:
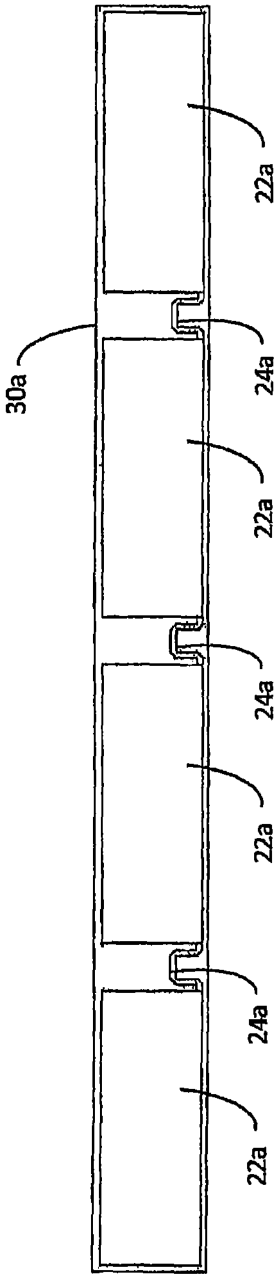
FIG. 5 is a first example of a parasitic element according to another aspect of the present invention.
Figure 6:
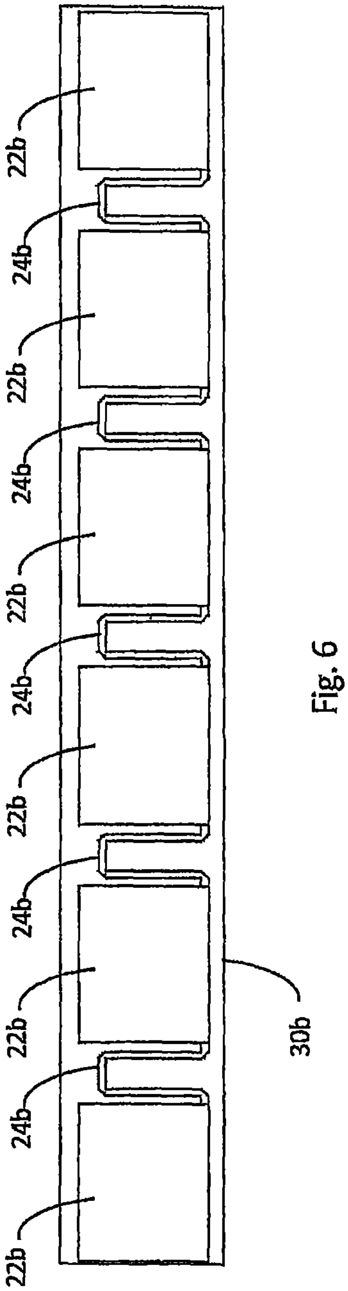
FIG. 6 is a second example of a parasitic element accordingly to another aspect of the present invention.

A first example of a cloaked low band parasitic element 30*a* is illustrated in FIG. 5. The segmentation of the parasitic elements may be accomplished in the same way as the segmentation of the dipole arms in FIG. 4. For example, parasitic element 30*a* includes four conductive segments 22*a* coupled by three inductors 24*a*. A second example of a cloaked low band parasitic element 30*b* is illustrated in FIG. 6. Parasitic element 30*b* includes six conductive segments 22*b* coupled by five inductors 24*b*. Relative to parasitic element 30*a*, the conductive segments 22*b* are shorter than the conductive segments 22*a*, and the inductor traces 24*b* are longer than the inductor traces 24*a*.

At high band frequencies, the inductors 24*a*, 24*b* appear to be high impedance elements which reduce current flow between the conductive segments 22*a*, 22*b*, respectively. Therefore the effect of the low band parasitic elements 30 scattering of the high band signals is minimized. However, at low band, the distributed inductive loading along the parasitic element 30 tunes the phase of the low band current, thereby giving some control over the low band azimuth beam width.

In a multiband antenna according to one aspect of the present invention described above, the dipole radiating element 16 and parasitic elements 30 are configured for low band operation. However, the invention is not limited to low band operation, the invention is contemplated to be employed in additional embodiments where driven and/or passive elements are intended to operate at one frequency band, and be unaffected by RF radiation from active radiating elements in other frequency bands. The exemplary low band radiating element 16 also comprises a cross-dipole radiating element. Other aspects of the invention may utilize a single dipole radiating element if only one polarization is required.

What is claimed is:

1. A cross dipole radiating element, comprising:

a first dipole arm that comprises a plurality of first conductive segments and a plurality of first metallization tracks that are each on a first non-conductive substrate, where the first metallization tracks are narrower than the first conductive segments, each first metallization track electrically connecting a respective pair of the first conductive segments.

2. The cross dipole radiating element of claim 1, further comprising a second dipole arm that comprises a plurality of second conductive segments and a plurality of second metallization tracks that are each on a second non-conductive substrate, where the second metallization tracks are narrower than the second conductive segments, each second metallization track electrically connecting a respective pair of the second conductive segments.

3. The cross dipole radiating element of claim 2, further comprising a third dipole arm and a fourth dipole arm, wherein the first dipole arm and the third dipole arm comprise a first dipole radiator and the second dipole arm and the fourth dipole arm comprise a second dipole radiator.

4. The cross dipole radiating element of claim 1, wherein the first metallization tracks comprise meandered metallization tracks.

5. The cross dipole radiating element of claim 1, wherein the first metallization tracks comprise U-shaped metallization tracks.

6. The cross dipole radiating element of claim 1, wherein the first metallization tracks comprise respective inductive elements.

7. A base station antenna that comprises:

the cross dipole radiating element of claim 1; and a second radiating element, wherein the cross dipole radiating element of claim 1 is configured to operate in a first frequency band and the second radiating element is configured to operate in a second frequency band that includes a frequency that is twice a frequency in the first frequency band.

8. The base station antenna of claim 7, wherein the first conductive segments each have a length that is less than one-half a wavelength of a highest frequency in the second frequency band.

9. The cross dipole radiating element of claim 8, wherein the first metallization tracks have an impedance that acts to attenuate currents in the second frequency band.

10. The cross dipole radiating element of claim 8, wherein the cross dipole radiating element is electrically invisible in the second frequency band.

11. The base station antenna of claim 7, wherein the first frequency band is the 694-960 MHz frequency band.

12. The base station antenna of claim 11, wherein the second frequency band is the 1695-2690 MHz frequency band.

13. The cross dipole radiating element of claim 1, wherein the plurality of first conductive segments comprises at least four conductive segments.

14. A cross dipole radiating element, comprising:

a first dipole arm that comprises a first metallization pattern on a first non-conductive substrate, the first metallization pattern including a plurality of first conductive segments and a plurality of U-shaped first metallization tracks.

15. The cross dipole radiating element of claim 14, wherein each U-shaped first metallization track electrically connects a respective pair of the first conductive segments.

16. The cross dipole radiating element of claim 14, wherein widths of the U-shaped first metallization tracks are narrower than widths of the first conductive segments.

17. The cross dipole radiating element of claim 14, further comprising a second dipole arm that comprises a second metallization pattern on a second non-conductive substrate, the second metallization pattern including a plurality of spaced-apart second conductive segments and a plurality of U-shaped second metallization tracks, each U-shaped second metallization track electrically connecting a respective pair of the second conductive segments.

18. A base station antenna, comprising:

a driven radiating element; and a passive parasitic element comprising a plurality of spaced-apart conductive segments that are electrically connected in series by a plurality of U-shaped metallization tracks.

19. The base station antenna of claim 18, wherein a number of metallization tracks included in the parasitic element is one less than a number of conductive segments included in the parasitic element.

20. The base station antenna of claim 18, wherein the conductive segments are arranged in a line.

* * * * *